United States Patent Office 3,152,399
Patented Oct. 13, 1964

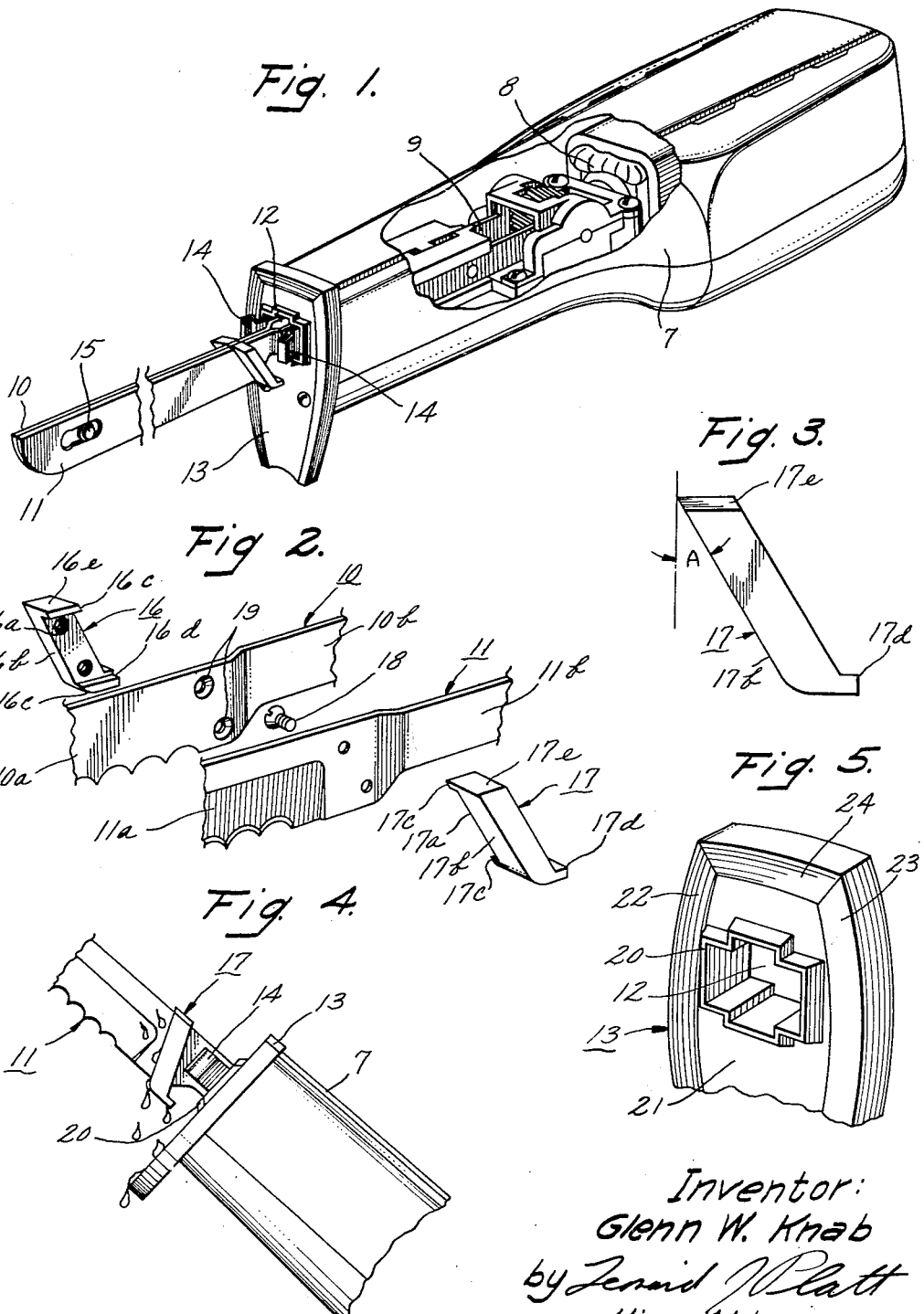

3,152,399
POWER-OPERATED SLICING KNIFE HAVING
FLUID FLOW CONTROL MEANS
Glenn W. Knab, Brockport, N.Y., assignor to General
Electric Company, a corporation of New York
Filed July 29, 1963, Ser. No. 298,306
3 Claims. (Cl. 30—272)

This invention relates to power-operated slicing knives and in particular to such knives intended for use in performing conventional culinary cutting chores.

Among the deterrents to the acceptance of power-operated slicing knives for everyday household use has been the lack of availability of a safe, reliable knife which may be readily maintained clean and odor-free after use. One problem which relates to all of these factors, involves the entrance of food particles and liquids into the area of the drive mechanism of the knife. Not only may such matter result in the clogging of and damage to the moving parts of the drive unit, but also, where the drive unit is housed in a casing, cleansing of the driven elements becomes very difficult and an odor problem arises. Furthermore, when the driving mechanism incorporates electrical apparatus, such as an electric motor, a safety hazard may be presented by the introduction of liquid into the drive mechanism.

Knives having one or more removable knife blades, to permit cleansing of the knife blades separately from the rest of the knife, present a further problem of safety. Difficulty may be encountered in the grasping and handling of the knife blades, which are often wet or greasy, for attaching or detaching the blades and the drive mechanism.

Accordingly, it is one object of this invention to provide an improved power-operated slicing knife.

It is another object of this invention to provide such a knife having means to prevent the flow of liquid or food particles from a movable knife blade into the knife drive mechanism.

It is still a further object of this invention to provide safe means for the handling of the knife blades.

In carrying out the objects of my invention in one form thereof, I provide a power-operated slicing knife having a handle, a drive mechanism supported by the handle and a cutting means having a pair of side faces. Means secured to the cutting means provide a pair of surfaces extending laterally, one from each side of the cutting means to prevent the flow of liquid or food particles along the side faces of the cutting means into the drive mechanism of the knife. The laterally extending surfaces extend from the top to the bottom of the vertical side faces of the cutting means in intimate contact therewith and are spaced forward from the handle. The laterally extending surfaces divert the flow of liquid and food particles along the side faces of the cutting means causing such material to drip away from the knife.

The knife mechanism may be housed in a hollow handle having an apertured forward end through which the cutting means passes for connection to the drive mechanism. In accordance with another aspect of my invention, to prevent foreign matter which strikes the forward surface of the knife handle from entering the drive mechanism, a projection is provided on the forward end of the handle, surrounding the aperture therein.

The pair of lateral surfaces, which are secured to the knife cutting means, extend sufficiently outwardly from the cutting means for engagement with the fingers of the user to provide a gripping or bracing portion for the attachment or detachment of the cutting means and the drive mechanism.

Other objects and advantages of my invention may best be understood by reference to the following description taken in connection with the accompanying drawings in which:

FIG. 1 is a perspective view of a power-operated knife in accordance with one form of the invention;

FIG. 2 is an exploded view of portions of the knife blades of the knife shown in FIG. 1 and certain elements which may be secured thereto;

FIG. 3 is a side view of one of the elements shown in FIG. 2;

FIG. 4 is a partial side view of the knife of FIG. 1 showing the flow of liquid or food particles when the knife is pointed upwardly; and FIG. 5 is an enlarged perspective view of a portion of the forward end of the handle of the power-operated slicing knife.

Referring now to the figures, FIG. 1 shows a power-operated slicing knife having a housing or casing 7 which encloses an electric motor 8 and a drive mechanism 9, and a pair of reciprocating cutters or knife blades 10 and 11. Drive mechanism 9 is operated by rearwardly positioned motor 8 and is adapted to be connected to blades 10 and 11 to drive the blades with a counter-reciprocating motion. Blades 10 and 11 pass through an aperture 12 in a forward end or hilt 13 of casing 7 to be connected to the drive mechanism within the casing. Preferably the blades are detachable from drive mechanism 9 as for example, by the use of a pair of resilient latch members, the forward portions 14 of which are shown immediately forward of the aperture 12.

Blades 10 and 11 are held in intimate face to face sliding contact along their inner surfaces by any conventional fastening means such as rivet and slot arrangement 15, and reciprocate in opposite directions simultaneously a limited predetermined distance. As can be seen in FIG. 2, the blades comprise forward cutting portions 10a and 11a as well as rearward tang portions 10b and 11b. Almost the entire length of the cutting portions have their lower edges serrated or scalloped and the height of the blade is substantially reduced along tang portions 10b and 11b. It can be seen that, when the knife is being operated, food particles and juices may move along the outer surfaces of blades 10 and 11 toward aperture 12 and, if preventative steps are not taken, such particles and liquids flow into the interior of casing 7 to collect amidst motor 8 and drive mechanism 9 creating the hazardous and undesirable conditions discussed above.

In order to eliminate the flow of foreign materials into the interior of casing 7 through aperture 12 by travel along the outer faces of blades 10 and 11, a pair of molded deflectors 16 and 17 are respectively secured to the outer surfaces of the knife blades. The deflectors are formed of thermoplastic or other suitable grease-resistant material.

Any suitable fastening means may be used to secure the deflectors 16 and 17 to their respective knife blades so that the inner vertical surfaces 16a and 17a of the deflectors are held in intimate contact with the outer surfaces of the blades. However, where fasteners such as screw 18 are utilized for this purpose and the deflectors are secured at the rear of the cutting portion of the blades, it is essential that no portion of the fasteners protrude beyond the inner surface of the cutting portion to interfere with the intimate sliding contact between the inner surfaces of the blades. This is accomplished for both blades, as shown for blade 10 in FIG. 2, by the use of countersunk holes such as 19 on the inner surface of the blades.

Deflectors 16 and 17 are identical mirror images of one another. Forward lateral surfaces 16b and 17b are provided on the deflectors which extend the full vertical height of the knife blade. Lateral projections 16c and 17c at both the bottom and top of deflectors 16 and 17 respectively, prevent the flow of liquids or food particles along the top and bottom surfaces of the blades by lying in close contact therewith.

The deflectors are also provided with rearwardly extending lower tongues 16d and 17d which assist in carrying the liquid or food particles away from the knife blades. Furthermore, the deflector top surfaces 16e and 17e slope downwardly toward the outer surface of the deflectors to direct the flow of any material which reaches the surfaces 16e and 17e outwardly away from the contacting inner faces of the blades. The slope of these surfaces is approximately 10° and may be seen with respect to deflector 17 in FIG. 3.

The positioning of deflectors 16 and 17 on their respective blades is of importance in achieving optimum results. As shown in FIG. 4 deflector 17 is secured adjacent the rear end of cutting portion 11a of blade 11. Of course, the deflectors must be located forward of casing aperture 12 and where engaging means extend forwardly from the aperture as do latch portions 14, the deflectors provide room for manual operation of the engaging means. Also, it should be noted that the lower portion of deflector 17, including tongue 17d extends, to the rear of the point at which the height of the blade is reduced to form tang portion 11b. Deflector 16 is similarly positioned with respect to tang portion 10b.

In order to maximize the flow of material downwardly along the laterally extending faces 16b and 17b of the deflectors 16 and 17, the deflectors are secured to the blades so that faces 16b and 17b are at an acute angle to the vertical. Preferably this angle is sufficient to divert the flow of liquid downwardly so as to drip from the bottom portion of the deflectors. Yet, as the deflectors are positioned between the cutting portions of the blades and casing 7 the angle should not be so large as to unduly increase the length of the blade.

As another aspect of my invention deflectors 16 and 17 additionally provide highly satisfactory safety grips to assist in engaging and disengaging the knife blades and the knife driving mechanism. This additional function of deflectors 16 and 17 also affects the optimum angle at which the members are secured to the knife blades. In other words, the forward lateral surfaces of the deflectors are preferably sufficiently close to a vertical orientation that they may be used as manual bracing elements for pushing the blades inwardly into engagement with the driven mechanism. In resolving the various factors determining the angle of faces 16b and 17b an angle of approximately 30° to the vertical as shown at A in FIG. 3 has been found to be highly satisfactory.

Regarding the use of deflectors 16 and 17 as grips for handling of the knife blades, it should also be pointed out that for this purpose surfaces 16b and 17b extend a sufficient lateral distance from the outer surfaces of the blades to permit convenient engagement with the user's fingers. Not only do deflectors provide bracing surfaces for use in attaching and detaching the knife blades from the drive mechanism, but they also provide the user with relatively dry gripping surface when the blades themselves are too slippery to handle safely due to a coating of food particles or liquid.

FIG. 4 illustrates the results achieved by deflectors 16 and 17 when liquid flows along the outer faces of the knife blades. Although FIG. 4 shows the knife tilted upwardly, a somewhat similar deflection of liquid flow is obtained when liquid flows along the outer faces of the knife blades, as a result of the reciprocal motion of the blades, when the blades are horizontally oriented. As the liquid or food particles move along the outer surfaces of the blades toward casing 7, they contact faces 16b and 17b of the deflectors and are then carried downwardly along these faces and drip from the lower portion of faces 16b and 17b or from tongues 16d and 17d. Some of these drippings may strike portions of hilt 13 as shown in FIG. 4.

While the majority of the drippings striking hilt 13 will drip downwardly off of the hilt, in the handling of the knife some drippings may flow toward aperture 12 of the casing. As another feature of my invention I have therefore provided, means to insure that such matter will not then reach the aperture to enter casing 7. The introduction of material into casing 7 in this manner is prevented by a unique raised surface or projection 20 which completely surrounds the opening in hilt 13 as shown in FIG. 5. Preferably, projection 20 is integrally formed with hilt 13 and actually defines aperture 12. To further control the flow of material striking hilt 13, the surface 21 of the hilt adjacent projection 20 is recessed slightly from the forwardly inclined peripheral surfaces 22, 23 and 24 at the sides and top of the hilt. Thus, material striking hilt 13 tends to flow toward the surface 21 and from there downwardly, no forwardly inclined surface being provided at the bottom of the hilt as can be seen in FIG. 1.

I have thus provided a power-operated slicing knife having reliable low cost means for preventing the flow of food materials from the article being sliced, along the cutting means, into the drive mechanism and motor area of the knife. Thus, the undesirable accumulation of foreign matter in the knife housing is eliminated, thereby preventing odor problems and the clogging of the drive mechanism. Also, the motor components are maintained free from the dangers of short circuiting presented by liquids entering the knife housing. Furthermore, safe gripping surfaces for the handling of detachable knife blades are also provided.

It is to be understood that the particular construction described herein is by way of example only and it is the aim of the appended claims to cover all such equivalent variations as come within the true spirit and scope of the foregoing disclosure.

What I claim as new and desire to secure by Letters Patent of the United States is:

1. A power-operated slicing knife having a hollow handle and including a forward end having means defining an aperture therein comprising:
   (a) a driving mechanism within said handle adapted to be operated from a source of power;
   (b) a knife blade having a forward cutting portion, a rearward tang portion, and a pair of side faces, said tang portion being adapted for connection to said driving mechanism within said handle and extending forwardly beyond the forward end of said handle;
   (c) means for removably connecting said blade to said driving mechanism;
   (d) the bottom edge of said tang portion being disposed above the bottom edge of said cutting portion when said blade is oriented in its normal cutting position;
   (e) a deflector mounted on said blade and spaced forwardly from said forward end having an outwardly extending forward surface, one edge of said forward surface being held in intimate contact with one of said side faces from the top to the bottom of said one face;
   (f) said surface being positioned forwardly of said tang portion; and
   (g) a rearwardly projecting portion on said lower surface disposed beneath said tang portion to carry any material striking said outwardly extending forward surface away from said blade.

2. A power-operated slicing knife comprising:
   (a) a housing having a forward end;
   (b) means fixed to the forward end of said housing defining an aperture formed therein;
   (c) means adapted to be driven from a source of power within said housing;
   (d) a knife blade having a pair of side faces and a rearward portion adapted for passage through said aperture for connection to said driven means;

(e) a deflector element mounted on said blade and spaced forwardly of said forward housing end and including an outwardly extending surface; said surface having one edge in intimate engagement with one of said side faces from the top to the bottom of said one side face to prevent the flow of material along said one side face of said blade rearwardly into said housing; and (f) a forwardly extending projection integrally formed on the said forward housing end and completely surrounding said aperture to prevent the flow of material on said forward end into said aperture.

3. A power-operated slicing knife having a hollow handle comprising:

(a) means within said handle adapted to be driven from a source of power;

(b) a pair of knife blades each having a forward cutting portion, a rearward tang portion for connection to said driven means, and an inner and an outer side face, said inner side faces being held in intimate sliding engagement with one another, said tang portions being adapted for separable connection to said driven means; and (c) a pair of deflectors, one being secured adjacent the rear end of each of said cutting portions and spaced forwardly from said housing on the outer faces of said blades and each including:

(aa) a forward generally flat surface having one edge in intimate contact with its respective outer blade face, (bb) a top portion extending inwardly to at least partially cover the top edge of its blade, (cc) a bottom portion extending inwardly under the bottom edge of its respective blade to at least partially cover said bottom edge, and (dd) a rearwardly extending tongue disposed beneath said rearward tang portion of its blade and spaced therefrom;

(ee) said forward surface sloping downwardly and rearwardly at an acute angle to the vertical when the blades are oriented in a horizontal cutting position to deflect the flow of any matter along the outer face of its respective blade and thereby prevent the introduction of material flowing along said outer faces into said handle;

(ff) said forward surface extending outwardly from said outer face a sufficient distance to provide a convenient pushing surface for the fingers of the user for connection of said blades to said driven means.

References Cited by the Examiner
UNITED STATES PATENTS

| | | | |
|---|---|---|---|
| 1,011,678 | 12/11 | Uto | 30—288 |
| 1,501,020 | 7/24 | Small | 30—295 X |
| 2,168,703 | 8/39 | Dziedzic et al. | 30—173 |
| 2,199,618 | 5/40 | Conover | 30—272 |
| 2,958,355 | 11/60 | Young | 30—272 X |
| 3,108,375 | 10/63 | Papp | 30—295 |

WILLIAM FELDMAN, *Primary Examiner.*

MILTON MEHR, *Examiner.*